April 29, 1969  J. FRIEDMAN  3,441,957

SWIMMING POOL AND UNDERWATER LIGHTING SYSTEM

Filed Oct. 27, 1966

INVENTOR
JEROME FRIEDMAN

BY Darby & Darby

ATTORNEYS

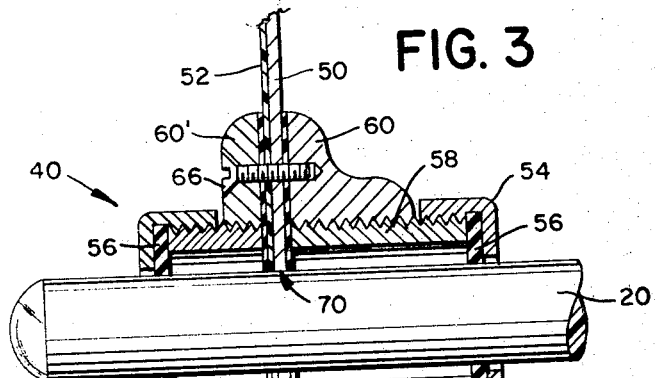
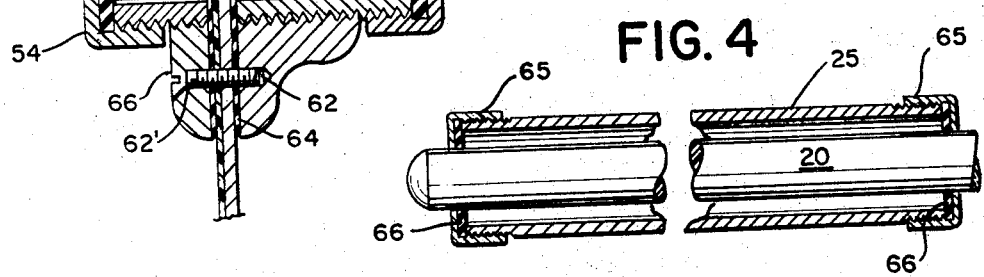
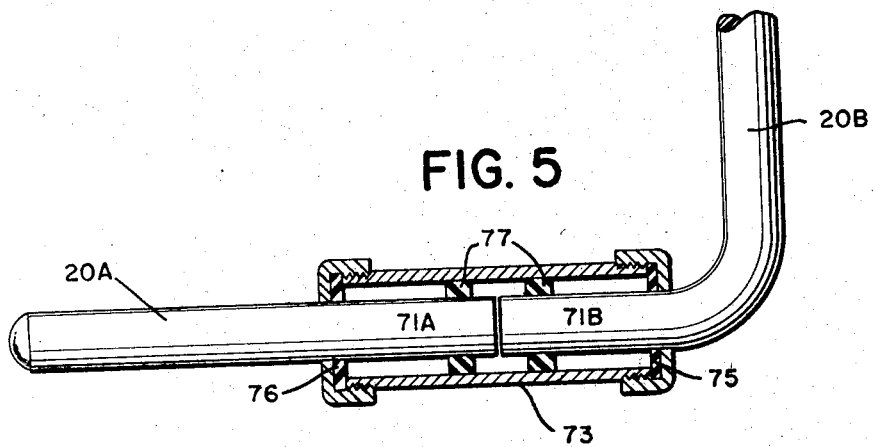

April 29, 1969   J. FRIEDMAN   3,441,957
SWIMMING POOL AND UNDERWATER LIGHTING SYSTEM
Filed Oct. 27, 1966

INVENTOR.
JEROME FRIEDMAN
BY Darby & Darby
ATTORNEYS

United States Patent Office 3,441,957
Patented Apr. 29, 1969

3,441,957
SWIMMING POOL AND UNDERWATER LIGHTING
SYSTEM
Jerome Friedman, 744 Bound Brook Road,
Dunellen, N.J. 08812
Filed Oct. 27, 1966, Ser. No. 589,944
Int. Cl. F21v 31/00
U.S. Cl. 240—26   19 Claims

ABSTRACT OF THE DISCLOSURE

A lighting system for a pool in which a light source and the electrical connections thereto are located a substantial distance away from any structural portion of the pool and light is conveyed to the water in the pool through an electrically non-conductive, light transmitting rod which is located between the light source and the pool wall. A housing for the light source is also provided including a reflector arrangement for passing light to the input end of the light conducting rod while conveying heat away therefrom.

---

This invention relates to underwater lighting systems and more particularly to systems for lighting swimming pools.

Several types of systems are currently used for lighting swimming pools. In the most commonly used one, an electric lamp is enclosed within a water tight fixture located in a housing (niche) in a wall of the pool. To supply current to the lamp, wires, usually buried underground, are brought from a source of current to an above ground deck box (junction box). A waterproof conduit extends underground from the back of the light housing to the deck box and wires connected to the lamp in the water tight light fixture extend through the back of the light housing into the conduit up to the deck box where they are spliced to the underground supply wire. The wires from the water tight light fixture and the water tight fixture itself are usually surrounded by water in the light housing and in the conduit. This is ncessary because the light unit is preferably or necessarily, water-cooled.

A system of the foregoing type has many disadvantages. Some of the more important ones are as follows:

(1) There is always the inherent danger that the glass on the light fixture may crack or the glass broken accidentally. When this happens water will leak into the fixture and cause current to be brought into the water where it becomes a major safety hazard, i.e., a short circuit.

(2) The sealing gasket or gaskets around the glass on the fixture may be defective or the bolts which apply pressure to the gasket may not be sufficiently tight to seal the fixture unit. Consequently, any leakage permits pool water to enter the unit to thereby bring current into the pool water. These bolts and gaskets require periodic checking and tightening in order to prevent the unit from shorting out.

(3) The compression fitting usually present where the wire enters the water tight light unit also requires periodic maintenance in order to maintain a proper seal and prevent an electrical short. Here again, leakage through the fitting allows pool water to enter the unit and bring current into the water.

(4) The gaskets and compression seal in (2) and (3) above must be replaced after several years, otherwise the tightening procedures outlined above are no longer effective and an electrical short may occur.

(5) In many instances the waterproof conduit exerts excessive pressure on the soldered connection of the conduit to the back of the light housing. The connection often breaks loose from the light housing and the water in the pool may leak out to the level of the connection. This condition is generally caused by settling of the ground around the conduit.

(6) Underwriters Laboratories specifications currently require that the conduit from the back of the light housing extend at least 4 feet back from the pool edge and curve sufficiently upward so that the deck (junction) box which is attached to the top of the conduit extends at least 8 inches above the highest possible level of water in the pool. This, of course, entails additional installation expense as well as providing an extra safety hazard in the form of the exposed junction box.

(7) Although it does not completely eliminate the problems above, a large percentage of the lights currently being installed have transformers to reduce the supply line voltage of 110 or 220 volts to 12 volts. Such transformers are desirable on units currently used because of the proximity of the wiring to the pool itself and the inherent dangers, some of which are reduced by using the transformer. Further, tampering with the low voltage system can defeat its purpose. However, of course, use of a transformer entails a great deal of additional expense and installation effort.

(8) Systems presently being used are subject to serious damage if the pool and light units are not properly winterized. The pool light fixture which normally has several feet of wire coiled in the housing behind the watertight light unit, must be removed from the pool and placed on the concrete deck around the pool to prevent it from being damaged by ice in the pool. The waterproof conduit which is made of metal such as copper, is also subject to damage by water freezing in it. This latter item creates a problem for the pool service company inasmuch as most pools are required to be kept full in the wintertime.

(9) The light housing itself creates a reasonably serious problem for the package pool (steel, aluminum, and wood vinyl lined pools, as well as fiber-glass pools) manufacturer and builder inasmuch as they have to provide a rather large opening in the pool wall with the proper mechanical means to prevent leakage from occurring around the light housing. Also, the panels in a package pool must be cut out at the factory so that the light fixture can be mounted in the cut-out. This creates a supply and inventory problem since many customers do not order a light with a pool.

(10) When pool owners turn on underwater lights that are not submerged and properly water-cooled this will cause the unit to overheat, burn insulation off wires, dry out and/or burn gaskets, and finally burn out the bulb. All this will take place in a relatively short time. When the bulb is replaced, the damage to gaskets and wires may not be noticed and therefore a faulty leaking fixture may be put back into operation with its inherent safety hazards.

(11) A bad electrical connection even as far away as the deck box may create a hazardous situation inasmuch as current can flow through the metal conduit and back to the pool.

It is generally agreed that an underwater light is desirable for a swimming pool for aesthetic reasons, as well as for swimmers' safety. A well illuminated pool where swimmers (at night) can be readily observed below water provides the safety factor necessary to take immediate corrective action if a swimmer is hurt or is a potential drowning victim. Also if a child or adult (nonswimmer) were to fall into a pool, he or she can be immediately located if an underwater light is on. However, because of the expense and inherent dangers discussed above, underwater lights are becoming increasingly less popular for pools. An improved unit would change this trend.

While the above comments are directed to in-ground residential and commercial pools where the wet-niche type of lights are presently being used many, if not all, of them apply equally as well to lighting systems for other types of underwater application. For example, most of the problems and hazards mentioned above, as well as additional considerations, render the wet-niche type of light discussed above impractical for above-ground pools such as rectangular pools of the redwood deck type as well as circular above ground pools. Of cource, lights for above ground pools would be desirable if a practical unit were available. Further, many of the problems and disadvantages referred to above also apply in the case of lighting for outdoor fountains.

The present invention relates to an improved underwater lighting system for swimming pools and fountains which overcomes the majority of disadvantages, particularly those concerned with safety, of prior art systems as well as simplifying installation problems and reducing cost. In accordance with the general principles of the invention, a light conducting rod of a relatively narrow diameter is used to carry light from a high intensity lamp located in a housing at a substantial distance from the edge of the pool. This light conducting rod normally enters the pool through a watertight fitting in the pool wall and transmits the light into the water. The light conducting rod used is a non-conductor of electricity and, therefore, the lighting system of the present invention possesses many electrical and mechanical advantages, of both safety and convenience. Among the electrical safety advantages, there is no electrical current carrying member brought near the pool and, therefore, no electrical hazard is presented. As one major mechanical advantage, only a relatively simple fitting is needed at the pool wall to bring the light conducting rod into light transmitting relationship with the water, instead of he bulkier light housing.

It is, therefore, an object of the invention to provide a novel swimming pool lighting system using a light conducting rod for transmitting light from a source through the wall of the pool.

Another object is to provide a swimming pool lighting system in which a light source is located in a housing with the light being carried in a curved path by a light conducting rod into the pool.

Still a further object is to provide a swimming pool lighting system utilizing a novel housing for a high intensity light source, the housing being located a considerable distance from the pool wall.

Yet another object is to provide novel apparatus for projecting a large intensity of light through a light conducting rod of relatively narrow diameter while at the same time preventing the associated infrared heat of the bulb from entering light conducting rod.

An additional object is to provide a novel underwater lighting system which eliminates or simplifies the majority of problems associated with wet niche underwater lights.

A further object is to provide a novel means of protecting the surface of a light conducting rod so as to be able to bury rod in ground without damaging or scratching the outer surface of the rod.

Another object of this invention is to provide a novel system for illuminating above ground pools.

Still another object is to provide a novel means of dispersing light from the end of a light conducting rod to illuminate pools.

A further object is to provide a novel fitting by which a light conducting rod can enter into light transmitting relationship with water in a pool or fountain.

Other objects and advantages of the present invention will become more apparent upon reference to the following specification and annexed drawings in which:

FIG. 3 is a view, taken partially in section, of a typical pool inlet fitting and a compression fitting which is designed to adapt the inlet fitting to receive a light conducting rod and prevent water from leaking out of pool;

FIG. 4 is a view of an arrangement for protecting a light conducting rod by encasing it in a length of pipe with compression fittings on the ends of pipe to seal out dirt and dust and prevent injury to the rod.

FIG. 5 shows, partially in cross-section, an arrangement for splicing together two light conducting rods of equal or dissimilar diameters by the use of a short length of pipe with compression fittings on the ends.

Figure 1:
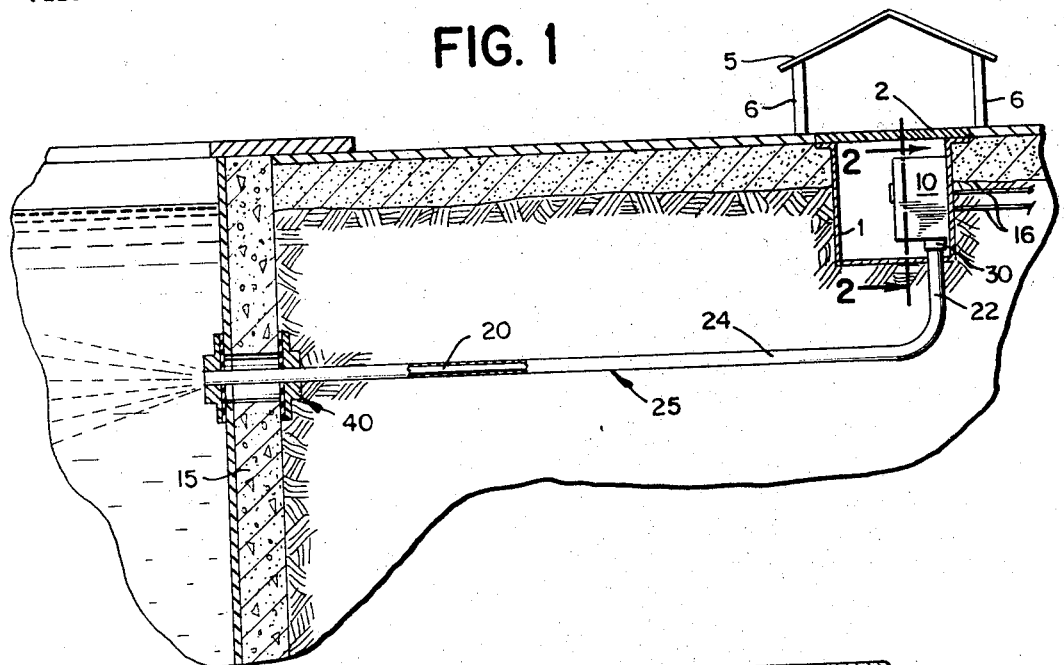
FIG. 1 is a view taken partially in section of a portion of a swimming pool and showing the general arrangement of the lighting system.

Referring to FIG. 1 the lighting system of the present invention, which is first shown for use with a below-ground swimming pool, includes a housing 10 for holding a suitable light source and other auxiliary equipment, which is described in detail below. The housing 10 is shown mounted by feet 3 in a well 1, which can be of concrete, aluminum, steel or other suitable material. The well is covered by a safety plate 2 which preferably is of the screen type or has a number of louvers to permit air flow into the well for cooling purposes. Of course, a non-vented enclosure can be used by taking advantage of conduction and radiation cooling.

The housing 10 which is preferably made of metal for heat dissipative purposes, can be mounted partially or completely above ground to provide increased cooling. A suitable rain shield, such as the conical shield 5 mounted on legs 6 is preferably provided to prevent water from entering housing 10. Also, the well 1 is preferably provided with drain run-offs (not shown).

A pair of current carrying wires 16 enter the housing for supplying energy to the light source. These wires, which can come through a conduit below ground or above ground, preferably terminate at a central control panel (not shown) located at a distance from the housing. This panel is usually available in most pool installations to control the operation of various other pieces of electrical equipment associated with the pool.

The light produced by the source in housing 10 is directed into one end of a rod 20 formed of a light conducting material. Any suitable conventional light conducting material can be used, for example, solid rods of the so-called fiber optic materials such as acrylic plastic, polycarbonate plastic, glass or bundles of fibers of these materials. Preferably, because of its lower cost, the material is a solid rod of plastic material such as Lucite acrylic resin. Another newer light conducting plastic material which is suitable is marketed under the trademark Crofon by Du Pont Corporation. The term "rod" applies to any of the aforesaid materials or fibers.

The end of the rod 20 which receives the light is brought into housing 10 by a suitable fitting 30 which is also described in detail below. The light conducting rod 20 is preferably formed and mounted so that the end receiving the light is substantially vertical to the surface of the ground with the rod having an angle bend of the proper radius (the inside radius of the curve should be equal to or greater than twice the thickness for acrylic resin) forming a short section 22 and a longer section 24 running at an angle thereto. Section 22 need be only a length sufficient to achieve a desired depth below the ground for section 24. It is preferred that housing 10 be located eight feet or more from the edge of pool. It should be understood that the location of housing 10 establishes the closest point to the pool at which electrical current is present.

While an angle bend configuration is shown for rod 20 in FIG. 1, it should be understood that other mounting configurations can be used. For example, an uncurved light conducting rod can be used between housing 10 and the pool wall and placed either horizontally or at an incline angle. Also, the rod can be curved in a desired shape, within its optical limits. Any combination of these configurations can be used to achieve the ultimate goal of having the light exit end of the rod enter the pool wall 15 at a desired depth.

As is conventional with light conducting rods or fibers, the outer surface may be coated with a suitable opaque substance. With acrylic resin rods, white opaque paint is often used. This prevents light from leaking out of any scratches along the length of the rod. Of course, the rod can also be enclosed in a protective sheath, for example, a soft flexible plastic tube, such as tube 25 shown in FIG. 1. The tube can be of any suitable material, for example, polyethylene or polypropylene plastic. The plastic preferably has a color dye to render it opaque and highly reflective. The tube can be either fit tightly around the rod or fiber bundle or be spaced therefrom by, for example, compression fittings spaced along the length of the rod. Washers, for example made of plastic, also can be used to space the rod from the tube. When spaced from the rod, the inner face of the tube 25 usually does not have to be made reflective. Also, if desired, the tube 25 can be padded on the outside to afford further protection.

The end of the rod section 25 which projects the light from source 12 into the pool enters a side wall 15 of the pool through a fitting 40 substantially transverse to this wall. Fitting 40 is water-tight and one form is described in greater detail below.

Figure 2:
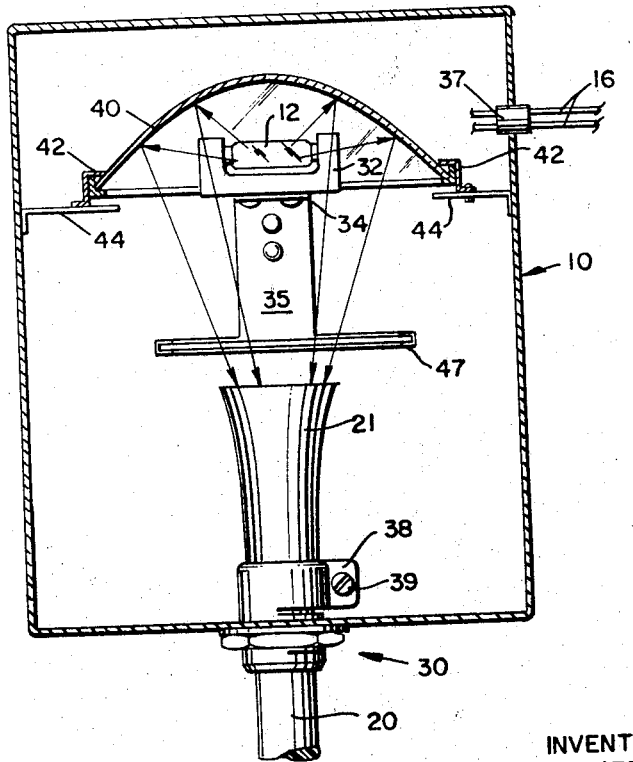
FIG. 2 shows the details of the light source and housing.

FIGURE 2 shows the details of the light source and housing 10. The housing 10 may be made of any suitable material, preferably metal, with a number of cooling passages or louvers. If desired a cooling fan may be utilized in the housing or well 1 to enhance the flow of air through the passages. Of course, the conductive and radiative cooling properties of the housing walls are also utilized and if these are adequate then the louvers and/or fans can be dispensed with.

The light source 12 is preferably a high intensity output incandescent type lamp, for example an iodine-quartz lamp utilizing a so-called halogen cycle to prevent blackening of the lamp inner wall. This gives the lamp a relatively long life. Lamps of this type are commercially available in wattage ratings of 75 to 1000 watts, and higher, and they have a relatively small size. The lamp is held by a socket 32 mounted on one upstanding arm 34 of a bracket 35. The current carrying wires 16 are brought into housing 10 through a suitable conventional coupling 37 mounted in a side wall. The wires 16 are connected to the terminals (not shown) of the lamp socket in a conventional manner. As described previously, the wires 16 run back to a central terminal board which has a switch to turn the lamp 12 on and off.

The lamp 12 is positioned by socket 32 and bracket 34 at the correct focus of a suitably contoured reflector 40. The reflector 40 can be paraboloidal or ellipsoidal or combinations of these curves, to project light into the light conducting rod. Several clips 42 hold the edges of the reflector 40 and are fastened to brackets 44 mounted to a housing wall. The clips and brackets hold the reflector stationary at a desired position in the housing. If desired the position of the reflector and/or lamp can be made adjustable to provide for the most efficient entry of light into the end of the rod.

The reflector 40 is preferably made of so-called dichroic coated glass or other similar type of material. This material reflects visible light into the light conducting rod and transmits heat (infra red energy) out through the back surface of the reflector.

The visible light from source 12 is reflected by the dichroic coated glass reflector 40 to the end of rod section 21. In some cases it is desirable to place a heat control filter plate 47, which also can be of dichroic coated glass, between the lamp and the rod. The filter plate 47 reflects heat energy back to the reflector and passes visible light to the rod. Heat reflected by plate 47 passes out through the back of the glass reflector 40. In this way, both by the heat transmitting action of the reflector and heat reflecting action of the filter plate, the amount of heat present at the light receiving end of rod 20 is substantially reduced.

The end of rod 20 is held in the housing 10 in the proper position for receiving light by fitting 30. The body of the fitting is slipped over the end of the rod, located at the desired place, and the fitting secured to the rod by a clamp portion 38 which is held tight by a screw 39. The fitting and rod are then passed through an opening in the housing and secured to the housing wall by a pair of nuts 39. As shown, the light-receiving end of the rod may be flared slightly or fitted with suitable entrance reflectors to provide a substantially wider entrance area for the light from the source. A suitable lens also can be provided to accomplish this.

FIGURE 3 shows the details of one type of fitting 40 useful for bringing the light conducting rod through the side of the pool. Here, the pool wall 50 is made of any suitable material such as steel, aluminum, wood or fiberglass and has a vinyl liner 52. A threaded compression fitting collar 54 with a compression gasket 56 located therein is slipped over the rod and its threads are screwed onto one end of a threaded nipple 58 which can be of brass or plastic. A threaded inlet fitting 60 with threaded holes 62 therethrough is threaded onto the other end of the nipple and a gasket 64 is located between the face of the fitting and the pool wall.

The compression fitting on the other side of the pool wall is identical with the one described above with the exception that the inlet fitting 60 has holes 62 thereon to accommodate screws 66. When the collars 54 are tightened and screws 66 are screwed into the threaded holes 62 a watertight seal is formed around the hole 70 made through the pool wall. The collars of the compression fittings and the gaskets hold the light conducting rod in the desired position. Other types of commercially available fittings, including other than compression fittings, also may be used.

FIGURE 4 shows an arrangement for encasing the light conducting rod 20 in the protective tube 25. As indicated before, when the protective tube 25 tightly fits rod 20, it has a highly reflective internal coating, for example white paint or a deposited reflective foil coating. The tube 25 does not have to be reflective if it is spaced from the rod. Tube 25 can be made, for example, of polyethylene or other similar type plastic material which is waterproof, flexible and soft enough to absorb a considerable amount of shock. Each end of the pipe is threaded to receive a threaded compression fitting 65 and gasket 66 which seals the ends of the tube from dirt and protects the outer surface of the light conducting rod.

In some cases, it is necessary to "splice" two pieces of light conducting rods together, that is, to place them end-to-end in a light conducting relationship. An arrangement for doing this is shown in FIG. 5. Here the two light conducting rods 20A and 20B, the latter of which has an angle bend, have their ends 71A and 71B placed adjacent each other. In most cases, the ends 71 are abutting. A short length of pipe 73 threaded at each end overlaps the adjacent ends of the two rods for a short distance and is held to the rods by the threaded compression fittings and gaskets 75, 76. The pipe 73 can also be of plastic material and the ends 71 of the rods are held at a fixed position therein by a pair of gaskets 77.

If desired, each of the rods 20A and 20B can be encased in a respective protective tube 25, as in FIG. 4. In this case the outer faces of the compression fittings 65 can be threaded and held to a threaded portion on the interior wall of pipe 73 to hold the faces of the rods 20A and 20B adjacent each other.

Figure 6:
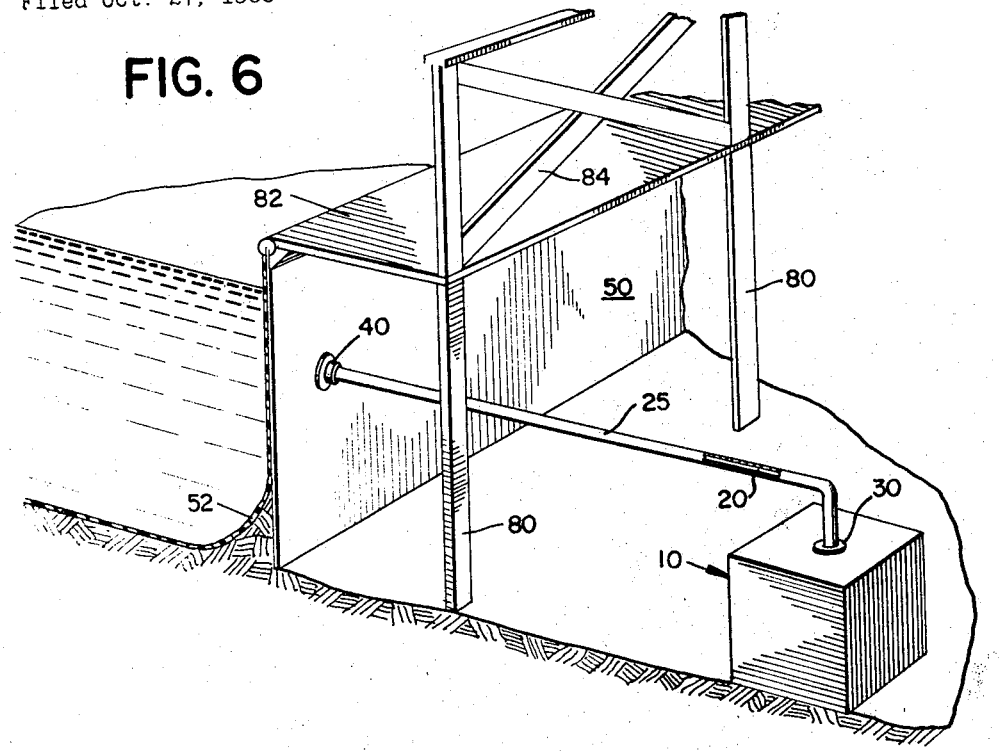
FIG. 6 shows a view, partially in section, of the lighting system used with an above-ground pool.

FIG. 6 shows the light conducting rod lighting system of the present invention used with an above-ground pool. The light source in housing 10 is the same as that previously described in FIGS. 1 and 2. Here, however, the rod 20 extends above ground level from the output fitting 30 into the space between two deck support beams 80 into a hole in the pool wall. As before, the rod 20 can be straight or bent with any desired angle. The end of rod 20 remote from the light source housing is brought through the pool wall 50 and vinyl liner 52 into light transmitting relationship with the water in the pool. A fitting of the type shown in FIG. 3 is utilized. Also, the rod 20 is preferably encased in a protective tube 25 in the same manner shown in FIG. 4. Reference numeral 82 indicates the deck of the pool while numeral 84 indicates its protective fence.

The above-ground-pool lighting system of FIG. 6 has many of the advantages of the below-ground-pool lighting system previously described. Here, however, the safety features of the present invention are considerably more important since the hazard of water coming in contact with electrical wiring or fixtures is considerably magnified in above-ground pools. This is so because considerably more electrical wiring must be exposed in an above-ground pool.

Figure 7:
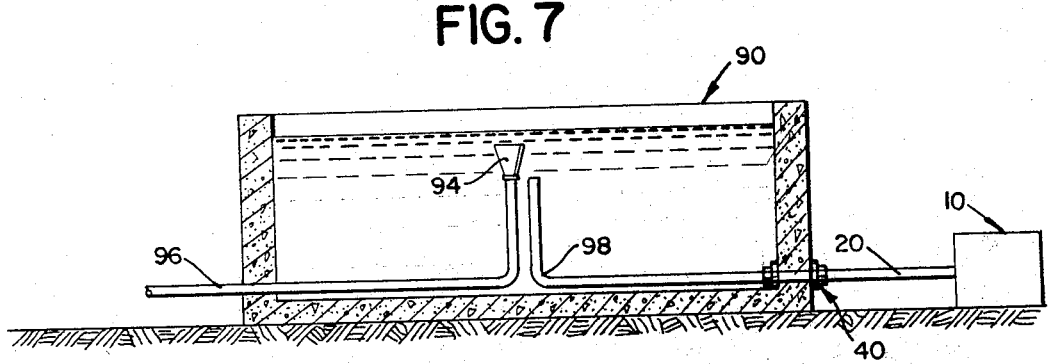
FIG. 7 shows a view, partially in section, of the lighting system used in an above-ground fountain.

FIG. 7 shows the lighting system of the present invention used in conjunction with the pool 90 of a water fountain 10. Here again, the details of the light source and housing are the same as those previously described. The light conducting rod 20 is brought through a wall of the fountain pool 90 by the same type of fitting shown in FIG. 3. Here, however, the length of the rod is extended to a point in the fountain which is adjacent the water nozzle 94 which sprays water brought in through a pipe 96. The end of rod 20 has an angle bend 98 so that its light shines upwardly through the water spray. Since the light exits from the rod at a point very close to the source of the water spray, excellent decorative lighting effects are obtained. Also, there is no problem of electrical shock hazard since the only part of the light producing system which is in water is the electrically non-conductive rod 20.

In the embodiment of FIG. 7 it is preferred that rod 20 be housed in a water-tight casing similar to that shown in FIG. 4.

While preferred embodiments of the invention have been described above, it will be understood that these are illustrative only, and the invention is limited solely by the appended claims.

What is claimed is:

1. In combination with a swimming pool having a wall with at least a portion of which is in contact with the fluid in the pool and a hole in said portion and a coping surrounding the pool wall, a lighting system comprising:
    a high intensity electrical light source, current carrying means for supplying current to said light source, said current carrying means and said light source spaced a substantial horizontal distance from the pool wall and the coping,
    an electrically non-conductive light conducting means formed of solid optical material for transmitting light from the source extending between said light source and said pool wall,
    means at one end of said light conducting means for holding it in light receiving relationship to said light source, the other end of said light conducting means being held in light projecting relationship to the hole in the pool wall to project light into the pool.

2. A lighting system for a fluid containing pool as set forth in claim 1 wherein said wall portion having said hole is located below ground level and said electrically non-conductive light conducting means extends for a considerable distance below ground level.

3. A lighting system for a fluid containing pool as in claim 1 wherein said wall portion having said hole is located above ground level and said electrically non-conductive light conducting means extends horizontally for a considerable distance above ground level.

4. A lighting system as in claim 1 further comprising a protective covering around said light conducting means.

5. A lighting system as in claim 4 wherein said light conducting means of solid material is in the form of a rod and the protective covering is a tube and further comprising fitting means at each end of the tube for sealing off the tube and rod to prevent the outer surface of the rod from being damaged while permitting light to be transmitted from one end thereof.

6. A lighting system as in claim 1 further comprising water-tight fitting means at the other end of said light conducting means for sealing off the hole in the pool wall and holding said other end of said light conducting means in light projecting relationship to the interior of the pool.

7. A lighting system as in claim 6 wherein said water-tight fitting means comprises a pair of compression fittings, one mounted on each side of the pool wall and both fittings engaging the light conducting means.

8. A lighting system as in claim 3 wherein the pool is part of a water fountain, and means for supplying water to said fountain, the end of said light conducting rod through which the light is transmitted positioned to project light in the same general direction as the water is dispersed from the source.

9. A lighting system as in claim 1 wherein the light conducting means is a rod and the end of the rod through which light is projected into the pool includes means for dispersing the light.

10. A lighting system as in claim 9 wherein said dispersing means is a lens.

11. A lighting system as in claim 9 wherein the end of the rod is ground to form said dispersing means.

12. A lighting system as in claim 1 further comprising light reflector means positioned adjacent said light source to focus the light from the source onto the light receiving end of the light conducting means.

13. A lighting system as in claim 12 wherein said light source is positioned between said reflector and the light receiving end of the light conducting means and the reflector includes means for transmitting heat from the light source therethrough in a direction away from the light conducting means.

14. A lighting system as in claim 12 further comprising a heat filter means positioned between the light source and the light receiving end of the light conducting means for passing visible light to the light receiving end of the light conducting means and for preventing heat from reaching said end.

15. A lighting system as in claim 13 further comprising a heat filter means positioned between the light source and the light receiving end of the light conducting means for passing visible light to the light receiving end of the light conducting means and for preventing heat from reaching said end.

16. A lighting system as in claim 12 further comprising a housing for said light source and said reflector means, first means in said housing for connection to the electrical current carrying means, said first means being the closest point to the pool at which electrical current is present in said lighting system.

17. A lighting system as in claim 16 further comprising means for bringing the light receiving end of the light conducting means into the housing, said light conducting means having at least one angle bend between the housing and the pool wall.

18. A lighting system as in claim 12 further comprising means at the light receiving end of the light conducting means to aid in the receipt and collection of the light from the source and the reflector means.

19. A light system as in claim 1 wherein said current carrying means is spaced at least five feet away from the pool wall.

(References on following page)

References Cited

UNITED STATES PATENTS

| | | | |
|---|---|---|---|
| 1,301,534 | 4/1919 | Armstrong | 240—26 |
| 1,762,383 | 11/1928 | Booraem | 240—26 |
| 1,965,865 | 7/1934 | Thompson | 240—1 |
| 2,034,792 | 3/1936 | Bergman. | |
| 2,257,038 | 9/1941 | Crossley | 240—26 |
| 2,424,064 | 7/1947 | Stegeman. | |
| 2,798,943 | 7/1957 | Prideaux | 240—47 |
| 2,852,980 | 9/1958 | Schroder | 240—47 |
| 1,351,562 | 8/1920 | Foster | 240—1 |
| 2,636,109 | 4/1953 | Cone | 240—1 |
| 3,331,956 | 7/1967 | Hough et al. | 240—1 |
| 3,337,725 | 8/1967 | Nash | 240—47 |
| 3,360,640 | 12/1967 | Seitz et al. | 240—1 |
| 3,361,031 | 1/1968 | Stroud | 240—1 |

NORTON ANSHER, *Primary Examiner.*

RICHARD M. SHEER, *Assistant Examiner.*

U.S. Cl. X.R.

240—1, 47